United States Patent Office 3,476,335
Patented Nov. 4, 1969

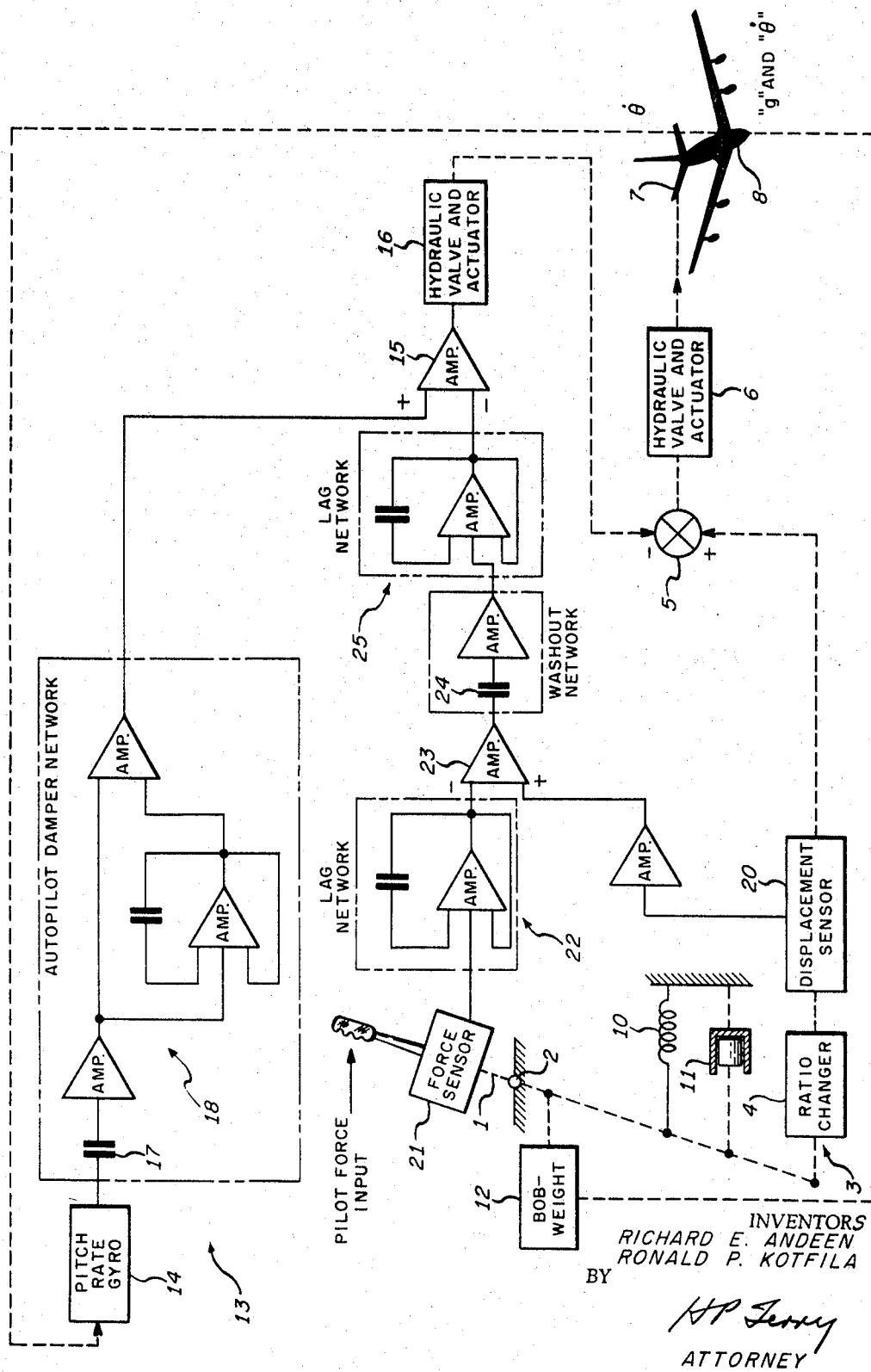

3,476,335
PSEUDO CONTROL STICK STEERING SYSTEM FOR AIRCRAFT HAVING A DAMPER SYSTEM
Richard E. Andeen and Ronald P. Kotfila, Phoenix, Ariz., assignors to Sperry Rand Corporation, a corporation of Delaware
Filed May 19, 1967, Ser. No. 639,807
Int. Cl. B64c 13/50
U.S. Cl. 244—77                    3 Claims

ABSTRACT OF THE DISCLOSURE

Apparatus for achieving desirable aerodynamic response of an aircraft to a manually commanded input by compensating for the natural sluggishness of an aircraft as well as the additional sluggishness due to a stability augmentation system.

BACKGROUND OF THE INVENTION

Field of the invention

The present invention pertains to aircraft flight control systems and particularly to means for compensating the systems when introducing manual input signals to achieve desirable aerodynamic response over a wide range of flight conditions.

Description of the prior art

Modern high speed aircraft have considerable inertia in pitch and yaw resulting in sluggish longitudinal characteristics. In addition, to achieve desirable stability characteristics, present day supersonic aircraft require stability augmentation particularly with respect to the pitch and yaw axes in the form of pitch and yaw damping systems. Unfortunately, the damper system further retards the maneuvering of the aircraft to pilot stick commands and the design of the damper system usually involves a compromise between aircraft stability and suitable handling qualities. Prior art systems endeavoring to achieve desirable aerodynamic response of the aircraft usually require full authority autopilot servo-actuators and increased system complexity in the form of parameter or gain control over the desired range of operation.

SUMMARY OF THE INVENTION

The present invention utilizes a relatively simple system in that pseudo control stick steering inputs derived from position and force pick-offs coupled to the pilot's control stick compensate for the inherent sluggishness of the aircraft and for the undesirable damping effects introduced by the damping systems. The utilization of both position and force signals from the control stick provides automatic adjustment over a wide range of aircraft speeds. By removing or "washing out" the position and force signals after a predetermined time interval, the necessity for long-term trim scheduling is eliminated. By means of the present invention, improvement in aircraft handling qualities is achieved without appreciably increasing system complexity. Further, the compensation may be achieved while utilizing limited authority autopilot servo-actuators in lieu of the full authority usually associated with prior art control stick steering systems.

BRIEF DESCRIPTION OF THE DRAWING

Referring now to the drawing, a schematic diagram, partially in block form, is shown of an aircraft flight control system incorporating the present invention with respect to the pitch axis.

DESCRIPTION OF THE PREFERRED EMBODIMENT

Referring now to the drawing, a conventional aircraft control system includes a control stick 1 pivoted about an axis 2 for providing manual input signals via a mechanical linkage 3 including a ratio changer 4 to one input connection of an algebraic summation device 5. The output of the summation device 5 controls a control surface hydraulic valve actuator assembly 6 for positioning the control surface which in this instance, for example, is the elevator 7 of an aircraft 8. Conventionally, the control stick 1 has associated with it a centralizing spring 10, a damper 11 and a bob-weight 12 or a both-weight simulator responsive to the pitch acceleration $\ddot{\theta}$ and normal acceleration $g$ of the aircraft 8.

To achieve desirable stability characteristics, the flight control system further includes stability augmentation with respect, in this example, to the pitch axis in the form of a pitch damper 13. The pitch damper 13 comprises a pitch rate gyro 14 which provides stability augmentation signals in response to the pitch rate $\dot{\theta}$ of the aircraft 8. The stability augmentation signals are applied via an autopilot damper amplifier 15 to an autopilot hydraulic valve actuator assembly 16 which in turn provides an autopilot damper input to another input connection of the algebraic summation device 5 in conjunction with the input commanded by the pilot in the form of a force applied to the control stick 1. Preferably, the hydraulic valve actuator assembly 16 has limited authority in order to prevent an inadvertent malfunction signal from causing the elevator 7 to deflect to an extent that the airframe is overstressed or the aircraft 8 placed in a dangerous attitude. The pitch damper 13 may also include a washout circuit in the form of a capacitor 17 as well as a lag compensation circiut 18 with the gain of the pitch damping signal selected in accordance with the characteristics of the particular aircraft. Use of pitch lag compensation permits rapid, well damped, short period responses to gust disturbances. However, it makes the aircraft responses to steady-state maneuvering comamnds sluggish at low speed flight conditions in the absence of the present invention.

At low speeds, the response of modern high speed aircraft is usually sluggish in pitch and yaw. The addition of the pitch and yaw dampers to improve stability further reduces aircraft response capabilities as indicated above. The present invention provides a form of control stick steering which in the present example is shown with respect to the pitch axis and the pitch damper system 13 to enhance aircraft response in pitch, it being equally applicable to the other axes.

In order to more fully appreciate the present invention, the control stick-bob-weight dynamics of a supersonic aircraft should be considered and may be represented by the following transfer function $$\frac{\delta_{ec}}{F_s} = \frac{K_s/T_s}{T_s S + 1}$$

where $\delta_{ec}$ is the commanded elevator deflection, $F_s$ is the stick force, $K_s/T_s$ is the stick force per elevator surface command, $T_s$ is a time constant associated with the dynamics of the stick and $S$ is the Laplace operator.

In accordance with the present invention, the response of the aircraft to steady-state commands can be speeded up by utilizing a form of "washed out" control stick steering referred to as pseudo control stick steering. Such a system is shown in the drawing in which a displacement sensor 20 is connected to be responsive to movement of the control stick 1 via linkage 3 for providing a control stick position signal which is added to the autopilot servo-actuator 16 in a polarity to aid pilot commanded maneuvers and to counteract the tendency of the pitch damper system 13 to inhibit such maneuvers. The effect of the stick position signal is primarily to speed up response at low speed flight conditions because the aircraft is usually sluggish at low speeds while it is usually responsive at high speeds. However, when the gain of the stick position or displacement signal is calibrated to improve low speed response characteristics to the extent necessary to achieve desirable aircraft response requirements, normally the pseudo control stick steering position signal is excessive at high aircraft speeds. This causes the aircraft to be oversensitive in maneuvers at high speeds, which is evidenced by an overshoot in the g response to pilot maneuvering commands, although the aircraft is basically well damped.

To eliminate the tendency for oversensitivity at high speeds, a control stick force signal is provided from a force sensor 21 coupled to the control stick 1 which provides a force signal proportional to the force applied by the pilot to the control stick 1. Use of the force signal is based upon the fact that stick forces associated with maneuvering flight increase very rapidly with the speed of the aircraft. Since the stick forces are high at a high speed and the amount of stick motion is less at higher speeds than at low speeds for maximum maneuvers, automatic compensation of the stick position signal is accomplished by subtracting the stick force signal from the stick position signal to achieve a greater degree of speed compensation for the pseudo control stick steering system over a wider range of aircraft speeds. The stick force signal from the force sensor is passed through a filter in the form of a lag network 22 before being subtracted from the stick position signal in an algebraic summing amplifier 23. The resultant signal from the amplifier 23 is then passed through a washout circuit in the form of a capacitor 24 which "washes out" the resultant signal after a predetermined time interval to eliminate the necessity for long-term trim adjustment. The resultant signal is then applied through a lag filtering network 25 from which it is connected in opposition to the pitch damper input signal in the algebraic summing amplifier 15.

The combination of pseudo control stick steering signals in the form of position and force stick signals in opposition to the damping signals has been shown to compensate for the sluggishness at low speeds and to eliminate the g overshoot associated with aircraft response at high speeds in a relatively simple manner without appreciably adding to the complexity of the flight control system.

While the invention has been described in its preferred embodiment, it is to be understood that the words which have been used are words of description rather than limitation and that changes may be made without departing from the true scope and spirit of the invention in its broader aspects.

We claim:

1. In a control system for a vehicle having a relatively sluggish response characteristic to manually commanded inputs about at least one axis thereof over a predetermined range of operation, which characteristic is further aggravated by a stability augmentation system operative with respect to said axis and said manually commanded inputs are applied via a control member which is responsive to a relatively low applied force to provide a relatively large displacement to be effective over said predetermined range of operation and beyond said range increasingly greater force with less displacement is required as a function of said range wherein the improvement comprises, position sensing means coupled to said control member for providing a position signal representative of the displacement of said control member from a predetermined position, force sensing means coupled to said control member for providing a force signal representative of the force applied to said control member, and means responsive to said position and force signals for providing a resultant signal in accordance with the difference therebetween to said control system in a manner to compensate for said sluggish response characteristics of said vehicle and those induced by said stability augmentation system whereby over said predetermined range of operation said position signal is primarily effective and beyond said range, said force signal becomes increasingly effective.

2. In a control system of the character recited in claim 1 in which said vehicle is an aircraft, said predetermined range of operation is relatively low speed flight, and said control member comprises control stick means whereby increasing pilot force is required to maneuver at higher speeds with less displacement of said control stick means.

3. In a control system of the character recited in claim 1 in which said last-mentioned means includes first algebraic summation means responsive to said position and force signals for providing a resultant signal in accordance with the difference therebetween, washout circuit means responsive to said resultant signal for eliminating its effectiveness after a predetermined time interval, second algebraic summation means responsive to signals from said stability augmentation system and to said resultant signal for providing a control signal in accordance with the difference therebetween to said control system.

References Cited

UNITED STATES PATENTS 3,236,478 2/1966 Adams et al. _____ 244—76
3,399,849 9/1968 Hendrick.

FOREIGN PATENTS 242,431 12/1962 Australia.

MILTON BUCHLER, Primary Examiner

J. L. FORMAN, Assistant Examiner

U.S. Cl. X.R.

318—489